United States Patent
Wang et al.

(10) Patent No.: US 11,315,477 B2
(45) Date of Patent: Apr. 26, 2022

(54) VEHICLE-MOUNTED DISPLAY CONTROL METHOD, VEHICLE-MOUNTED CONTROL DEVICE AND VEHICLE-MOUNTED DISPLAY ASSEMBLY

(71) Applicant: BOE TECHNOLOGY GROUP CO., LTD., Beijing (CN)

(72) Inventors: Zhimao Wang, Beijing (CN); Weiguo Li, Beijing (CN); Yanfu Li, Beijing (CN); Xue Li, Beijing (CN); Enhui Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/044,247

(22) PCT Filed: Nov. 18, 2019

(86) PCT No.: PCT/CN2019/119163
§ 371 (c)(1),
(2) Date: Sep. 30, 2020

(87) PCT Pub. No.: WO2021/097606
PCT Pub. Date: May 27, 2021

(65) Prior Publication Data
US 2021/0166615 A1    Jun. 3, 2021

(51) Int. Cl.
*G09G 3/20* (2006.01)
*G06F 3/14* (2006.01)
(Continued)

(52) U.S. Cl.
CPC .......... *G09G 3/2096* (2013.01); *B61L 15/009* (2013.01); *G06F 3/1423* (2013.01);
(Continued)

(58) Field of Classification Search
CPC .... B61L 15/009; G06F 3/1423; G09F 21/049; G09F 27/00; G09G 3/2096; G09G 3/36;
(Continued)

(56) References Cited

U.S. PATENT DOCUMENTS 10,410,319 B2 * 9/2019 Wunderlich .......... G06F 3/0488
10,509,613 B2 * 12/2019 Soh ........................ B60K 37/06
(Continued)

FOREIGN PATENT DOCUMENTS

CN    102186052 A    9/2011
CN    103390396 A    11/2013
(Continued)

*Primary Examiner* — Nelson M Rosario
(74) *Attorney, Agent, or Firm* — Procopio, Cory, Hargreaves & Savitch LLP

(57) ABSTRACT

A vehicle-mounted display control method includes: receiving, by a vehicle-mounted control device, a signal to be displayed transmitted by a signal source; converting, by the vehicle-mounted control device, the signal to be displayed into a relay data signal, and transmitting, by the vehicle-mounted control device, the relay data signal to a signal conversion circuit of a corresponding vehicle-mounted display assembly; and converting, by the signal conversion circuit, the relay data signal into a display drive signal, and outputting, by the signal conversion circuit, the display drive signal to at least one display screen of the vehicle-mounted display assembly, so as to drive the at least one display screen to display.

14 Claims, 8 Drawing Sheets

(51) Int. Cl.
  *G09G 3/36* (2006.01)
  *B61L 15/00* (2006.01)
  *G09F 21/04* (2006.01)
  *G09F 27/00* (2006.01)

(52) U.S. Cl.
  CPC ............ *G09F 21/049* (2020.05); *G09G 3/36* (2013.01); *G09F 27/00* (2013.01); *G09G 2330/021* (2013.01); *G09G 2354/00* (2013.01); *G09G 2360/04* (2013.01); *G09G 2380/10* (2013.01)

(58) Field of Classification Search
  CPC ......... G09G 2330/021; G09G 2354/00; G09G 2360/04; G09G 2380/10
  See application file for complete search history.

(56) References Cited

U.S. PATENT DOCUMENTS

| | | |
|---|---|---|
| 2003/0001981 A1 | 1/2003 | Milne |
| 2016/0274856 A1 | 9/2016 | Liu et al. |
| 2021/0026470 A1* | 1/2021 | Perdices-Gonzalez ................. B60R 11/0235 |

FOREIGN PATENT DOCUMENTS

| | | |
|---|---|---|
| CN | 104123915 A | 10/2014 |
| CN | 108376538 A | 8/2018 |
| CN | 108682384 A | 10/2018 |

* cited by examiner

VEHICLE-MOUNTED DISPLAY CONTROL METHOD, VEHICLE-MOUNTED CONTROL DEVICE AND VEHICLE-MOUNTED DISPLAY ASSEMBLY

CROSS-REFERENCE TO RELATED APPLICATION

This application is a national phase entry under 35 USC 371 of International Patent Application No. PCT/CN2019/119163 filed on Nov. 18, 2019, which is incorporated herein by reference in its entirety.

TECHNICAL FIELD

The present disclosure relates to the field of display technologies, and in particular, to a vehicle-mounted display control method, a vehicle-mounted control device and a vehicle-mounted display assembly.

BACKGROUND

As a public vehicle, the rail vehicle has a large passenger traffic volume, and can play an important role in urban traffic development. By arranging a display system in the carriage of the rail vehicle, the display system can be used to display image and video information for passengers, so as to improve the riding experience of the passengers.

SUMMARY

In one aspect, a vehicle-mounted display control method is provided. The vehicle-mounted display control method includes: receiving, by a vehicle-mounted control device, a signal to be displayed sent by a signal source; converting, by the vehicle-mounted control device, the signal to be displayed into a relay data signal, and transmitting, by the vehicle-mounted control device, the relay data signal to a signal conversion circuit of a corresponding vehicle-mounted display assembly; and converting, by the signal conversion circuit, the relay data signal into a display drive signal, and outputting, by the signal conversion circuit, the display drive signal to at least one display screen of the vehicle-mounted display assembly, so as to drive the at least one display screen to display. The vehicle-mounted control device and the vehicle-mounted display assembly are disposed in a vehicle body including a housing and a carriage body located in the housing, the vehicle-mounted control device is located between the carriage body and the housing, and the vehicle-mounted display assembly is located in the carriage body.

In some embodiments, transmitting, by the vehicle-mounted control device, the signal to be displayed that is transmitted as a relay data signal to the signal conversion circuit of the corresponding vehicle-mounted display assembly, includes: transmitting, by the vehicle-mounted control device, the relay data signal to the signal conversion circuit of the corresponding vehicle-mounted display assembly in a wired transmission manner or a wireless transmission manner.

In some embodiments, the number of the vehicle-mounted display assemblies is at least two, the vehicle-mounted control device corresponds to the at least two vehicle-mounted display assemblies, and the vehicle-mounted control device includes a first distribution circuit. Transmitting, by the vehicle-mounted control device, the signal to be displayed that is transmitted as a relay data signal to the signal conversion circuit of the corresponding vehicle-mounted display assembly, further includes: copying, by the first distribution circuit, the relay data signal into at least two relay data signals, and transmitting, by the first distribution circuit, the at least two relay data signals to signal conversion circuits of the at least two vehicle-mounted display assemblies in a one-to-one correspondence.

In some embodiments, the vehicle-mounted control device includes a second distribution circuit. The vehicle-mounted display control method further includes: copying, by the second distribution circuit, the signal to be displayed into at least two signals to be displayed; and converting, by the vehicle-mounted control device, one of the at least two signals to be displayed into the relay data signal.

In some embodiments, the number of the vehicle-mounted control devices is at least two, the at least two vehicle-mounted control devices are cascaded, and a second distribution circuit of each of the at least two vehicle-mounted control device is electrically connected to a next-level vehicle-mounted control device.

The vehicle-mounted display control method further includes: transmitting, by the vehicle-mounted control device, an unconverted signal to be displayed of the at least two signals to be displayed to the next-level vehicle-mounted control device cascaded therewith.

In some embodiments, the at least one display screen includes at least two display screens, and the vehicle-mounted display assembly further includes a third distribution circuit. Outputting, by the signal conversion circuit, the display drive signal to at least one display screen of the corresponding vehicle-mounted display assembly, further includes: outputting, by the signal conversion circuit, the display drive signal to the third distribution circuit; and copying, by the third distribution circuit, the display drive signal into at least two display drive signals, and transmitting, by the third distribution circuit, the at least two display drive signals to at least two display screens of the vehicle-mounted display assembly in a one-to-one correspondence.

In some embodiments, the relay data signal includes one of a high definition multimedia interface (HDMI) format signal, a digital visual interface (DVI) format signal, or a display port (DP) format signal.

In another aspect, a vehicle-mounted control device is provided. The vehicle-mounted control device includes: at least one signal input interface configured to receive a signal to be displayed; a processor electrically connected to the at least one signal input interface, and configured to transmit the signal to be displayed that is transmitted as a relay data signal; and at least one signal output interface electrically connected to the processor, and configured to transmit the relay data signal.

In some embodiments, the at least one signal output interface includes at least two signal output interfaces. The vehicle-mounted control device further includes a first distribution circuit. The first distribution circuit is electrically connected to the processor and the at least two signal output interfaces. The first distribution circuit is configured to copy the relay data signal into at least two relay data signals, and transmit the at least two relay data signals to the at least two signal output interfaces in a one-to-one correspondence.

In some embodiments, the vehicle-mounted control device further includes a second distribution circuit. The second distribution circuit is electrically connected to the processor and the at least one signal input interface. The second distribution circuit is configured to copy the signal to be displayed into at least two signals to be displayed, and transmit one of the at least two signals to be displayed to the processor.

In yet another aspect, a vehicle-mounted display assembly is provided. The vehicle-mounted display assembly includes: at least one display screen and a signal conversion circuit. The signal conversion circuit is electrically connected to the at least one display screen, and the signal conversion circuit is configured to receive a relay data signal, convert the relay data signal into a display drive signal, and output the display drive signal to the at least one display screen to drive the at least one display screen to display.

In some embodiments, the at least one display screen includes at least two display screens. The vehicle-mounted display assembly further includes a third distribution circuit. The third distribution circuit is electrically connected to the signal conversion circuit and the at least two display screens. The third distribution circuit is configured to copy the display drive signal into at least two display drive signals and transmit the at least two display drive signals to the at least two display screens in a one-to-one correspondence.

In some embodiments, at least two of the signal conversion circuit, the third distribution circuit, or the at least one display screen are integrated.

In yet another aspect, a vehicle-mounted display system is provided. The vehicle-mounted display system includes at least one vehicle-mounted control device as described in any of the above embodiments and at least one vehicle-mounted display assembly according to any of the above embodiments. The number of the vehicle-mounted control devices is at least two, and the at least two vehicle-mounted control devices are cascaded. The vehicle-mounted display assembly is electrically connected to a corresponding vehicle-mounted control device.

In some embodiments, the vehicle-mounted display system further includes a power management module. The power management module is electrically connected to at least one vehicle-mounted control device and at least one vehicle-mounted display assembly.

In yet another aspect, a vehicle is provided. The vehicle includes a vehicle body and a vehicle-mounted display system as described in any of the above embodiments disposed in the vehicle body. The vehicle body includes a housing and a carriage body disposed in the housing. The at least one vehicle-mounted control device is disposed between the carriage body and the housing of the vehicle body. The at least one vehicle-mounted display assembly is disposed in the carriage body of the vehicle body.

In some embodiments, the vehicle further includes a connecting line. A vehicle-mounted display assembly is electrically connected to a corresponding vehicle-mounted control device through the connecting line, and at least part of the connecting line is located between the carriage body and the housing.

In some embodiments, the vehicle further includes at least one armrest. The at least one armrest is disposed in the carriage body. At least one vehicle-mounted display assembly of the vehicle-mounted display system is disposed on a corresponding armrest of the at least one armrest. In a case where the vehicle-mounted display assembly is electrically connected to the corresponding vehicle-mounted control device through the connecting line, at least part of the connecting line is located in the armrest corresponding to the vehicle-mounted display assembly, or at least part of the connecting line is located between the carriage body and the housing, or at least part of the connecting line is located in the armrest corresponding to the vehicle-mounted display assembly and at least part of the connecting line is located between the carriage body and the housing.

BRIEF DESCRIPTION OF THE DRAWINGS

In order to describe technical solutions in some embodiments of the present disclosure more clearly, the accompanying drawings to be used in the description of some embodiments will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in some embodiments of the present disclosure will be described clearly and completely in combination with the accompanying drawings in some embodiments of the present disclosure. Obviously, the described embodiments are merely some but not all of the embodiments of the present disclosure. All other embodiments made on the basis of the embodiments of the present disclosure by a person of ordinary skill in the art shall be included in the protection scope of the present disclosure.

With the development of society and the advancement of technology, people have put forward higher performance and more diversified requirements for vehicle-mounted display systems used in rail vehicles, such as better multimedia functions, clearer image display, better appearance and higher space utilization rate.

Figure 1:
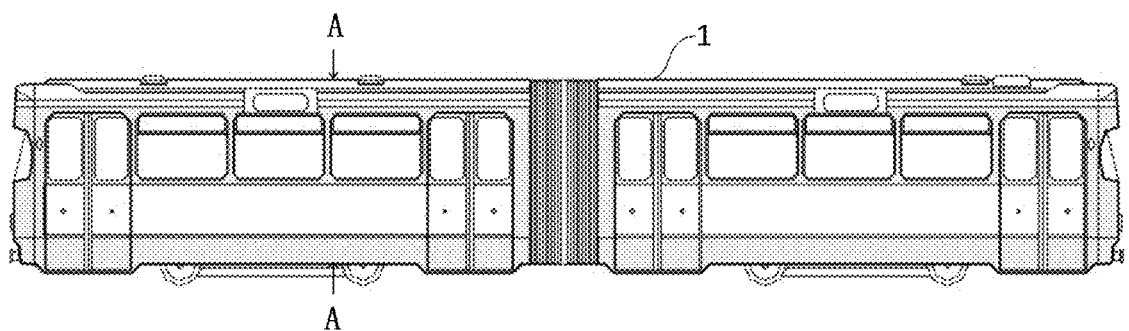
FIG. 1 is a schematic diagram of a vehicle, according to some embodiments of the present disclosure.

As shown in FIG. 1, a vehicle includes a vehicle body 1 and a vehicle-mounted display system (not shown in the figure) disposed inside the vehicle body 1. The vehicle-mounted display system is disposed in a carriage body used for carrying passengers in the vehicle body 1. The vehicle-mounted display system includes a control device and a display assembly, and the control device is electrically connected to the display assembly. The control device and the display assembly are integrated and arranged as an integrated structure. The control device transmits data signals to the display assembly to realize the display of the display assembly. The format of the data signal is low voltage differential signaling (LVDS) format, mobile industry processor interface (MIPI) format or embedded display port (EDP) format. Herein, the control device and the display assembly are arranged in an integrated manner, so that a distance between the control device and the display assembly is relatively short, which is beneficial to the signal transmission between the control device and the display assembly. However, the integrated arrangement of the control device and the display assembly causes the vehicle-mounted display system to occupy a large space in the carriage body. In addition, the control device has the functions of signal conversion and signal transmission, as well as audio playing, peripheral interface, and the like. Hardware structures corresponding to these functions each have a certain volume, so that the volume of the control device is large. Therefore, the volume of the vehicle-mounted display system is large, and occupies a large space in the carriage body, which affects the appearance of the interior of the carriage body.

Figure 2:
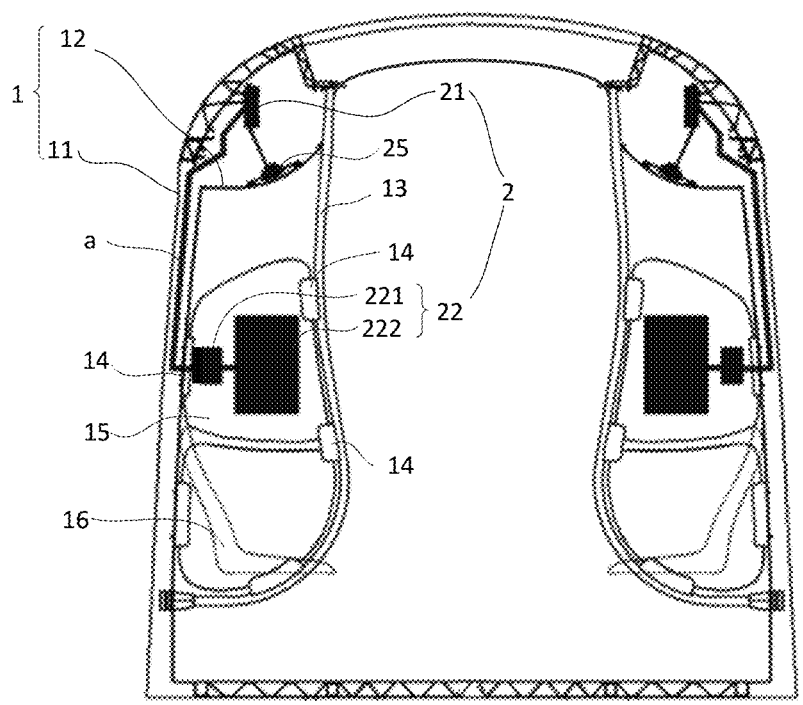
FIG. 2 is a schematic diagram of AA section of the vehicle shown in FIG. 1.

On this basis, the present disclosure provides a vehicle. As shown in FIG. 2, the vehicle includes a vehicle body 1 and a vehicle-mounted display system 2 disposed inside the vehicle body 1. The vehicle body 1 includes a housing 11 and a carriage body 12 disposed in the housing 11. The carriage body 12 of the vehicle includes at least one carriage.

In some embodiments, as shown in FIG. 2, the vehicle-mounted display system 2 includes at least one vehicle-mounted control device 21, and at least one vehicle-mounted display assembly 22 electrically connected to each vehicle-mounted control device 21 correspondingly. Each vehicle-mounted control device 21 is configured to control the display of the corresponding vehicle-mounted display assembly 22. The vehicle-mounted control device 21 is located between the housing 11 and the carriage body 12, and the vehicle-mounted display assembly 22 is located in the carriage body 12.

For example, one vehicle-mounted control device 21 is correspondingly disposed in each carriage. Or, a plurality of vehicle-mounted control devices 21 are correspondingly disposed in each carriage. The number of the vehicle-mounted control devices 21 and the corresponding relationship between the vehicle-mounted control device 21 and the carriage is not limited in some embodiments of the present disclosure. In addition, one vehicle-mounted control device 21 corresponds to one vehicle-mounted display assembly 22. Or, one vehicle-mounted control device 21 corresponds to a plurality of vehicle-mounted display assemblies 22. The number of the vehicle-mounted control devices 21, the number of the vehicle-mounted display assemblies 22, and the corresponding relationship between the vehicle-mounted control device 21 and the vehicle-mounted display assembly 22 are not limited in some embodiments of the present disclosure.

Figure 4:
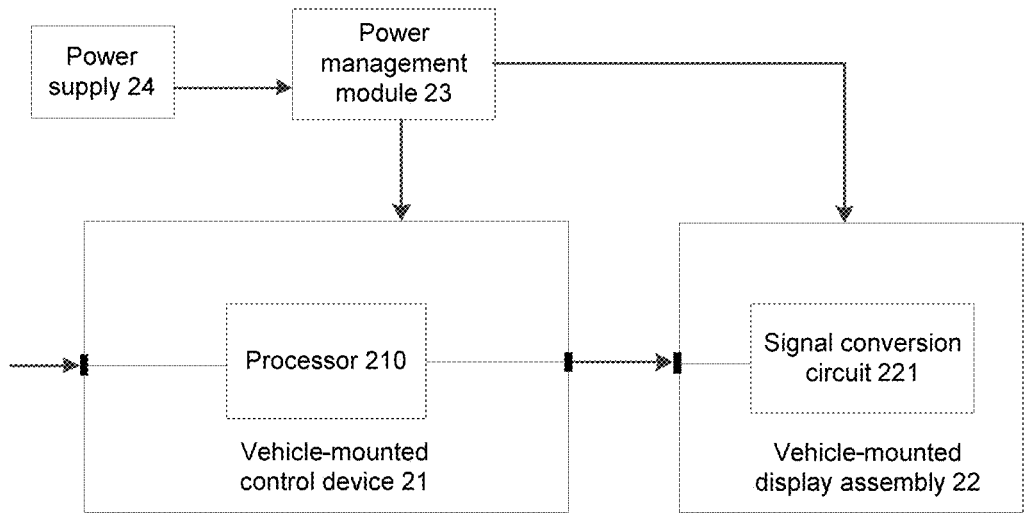
FIG. 4 is a schematic diagram of a vehicle-mounted display system, according to some embodiments of the present disclosure.

In some embodiments, as shown in FIG. 4, the vehicle-mounted display system 2 further includes a power supply 24 and a power management module 23. The power management module 23 is electrically connected to the power supply 24, at least one vehicle-mounted control device 21 and at least one vehicle-mounted display assembly 22. The power management module 23 is configured to effectively distribute the power signal of the power supply to the vehicle-mounted control device 21 and the vehicle-mounted display assembly 22.

In some embodiments, as shown in FIG. 2, the vehicle-mounted display system further includes a loudspeaker 25, and the loudspeaker 25 includes a sound outlet port. The loudspeaker 25 is disposed between the top of the carriage body 12 and the housing 11 of the vehicle body 1, and the sound output port of the loudspeaker 25 is disposed toward the carriage body 12. On this basis, the audio coverage of the loudspeaker 25 is increased, so as to prevent the passengers proximate to the loudspeaker from being disturbed due to the loud sound, and prevent the sound heard by the passengers far away from the loudspeaker from being hindered. The loudspeaker 25 is electrically connected to the vehicle-mounted control device 21, and the vehicle-mounted control device 21 provides audio control signals to the loudspeaker 25, so as to realize the audio playing and the image display simultaneously.

In some embodiments, as shown in FIG. 2, the vehicle-mounted control device 21 is located between the housing 11 and the carriage body 12, and the vehicle-mounted display assembly 22 corresponding to the vehicle-mounted control device 21 is located inside the carriage body 12. That is, the vehicle-mounted control device 21 and the vehicle-mounted display assembly 22 in the vehicle-mounted display system 2 are arranged separately, and the vehicle-mounted control device 21 is arranged outside the carriage body 12. In this way, the space in the vehicle body 1 may be effectively used, so that the visible part of the vehicle-mounted display system 2 in the carriage body is thinner and lighter, and the appearance of the interior of the carriage body 12 is improved.

Herein, there is a certain distance between the vehicle-mounted control device 21 and the vehicle-mounted display assembly 22. For example, a signal transmission distance between the vehicle-mounted control device 21 and the corresponding vehicle-mounted display assembly 22 is greater than two meters. In this case, if a LVDS format signal, a MIPI format signal or an EDP format signal is used as the transmission signal between the vehicle-mounted control device 21 and the corresponding vehicle-mounted display assembly 22, the signal transmission between the vehicle-mounted control device 21 and the corresponding vehicle-mounted display assembly 22 is likely to be unstable, and thereby the image display effect of the vehicle-mounted display assembly 22 is poor. For example, the image displayed by the vehicle-mounted display assembly 22 is not clear.

Figure 5:
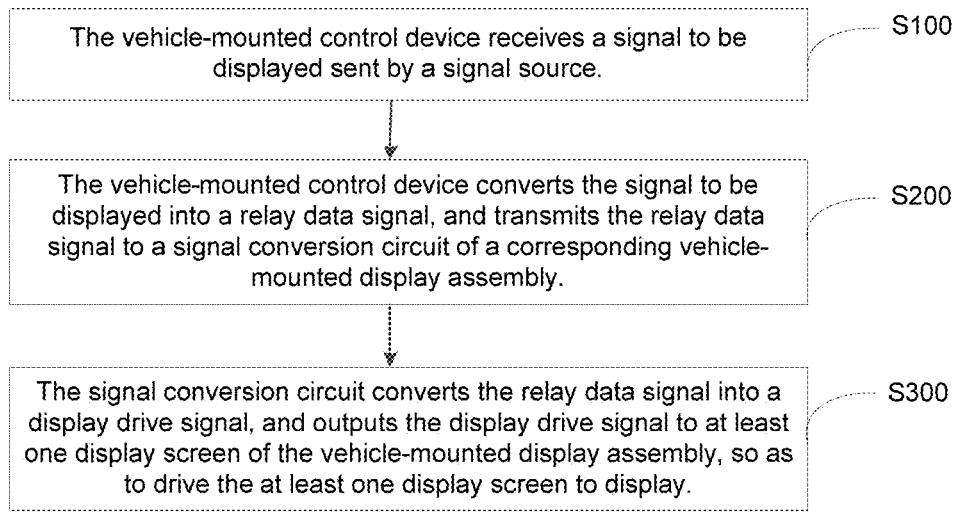
FIG. 5 is a schematic flow chart of a vehicle-mounted display control method, according to some embodiments of the present disclosure.

On this basis, as shown in FIG. 5, some embodiments of the present disclosure provide a vehicle-mounted display control method, which includes S100 to S300.

In S100: the vehicle-mounted control device 21 receives a signal to be displayed sent by a signal source.

In S200: the vehicle-mounted control device 21 converts the signal to be displayed into a relay data signal, and transmits the relay data signal to a signal conversion circuit 221 of a corresponding vehicle-mounted display assembly 22.

The signal to be displayed is usually provided by the signal source. The vehicle-mounted control device 21 is electrically connected to the signal source to receive the signal to be displayed, and transmits the signal to be displayed, which is transmitted as the relay data signal, to the corresponding vehicle-mounted display assembly 22.

Herein, the relay data signal is a video signal that may be transmitted over a long distance (e.g., greater than or equal to two meters) and has good data transmission quality. The video signal may be, for example, a television signal, a still image signal, or a visual television image signal. For example, the relay data signal is a digital visual interface (DVI) format signal, a high definition multimedia interface (HDMI) format signal, or a display port (DP) format signal. Some embodiments of the present disclosure do not limit the type of the signal format of the relay data signal, as long as the relay data signal can achieve a high quality and long distance transmission for the display of the vehicle-mounted display assembly 22.

Herein, in some embodiments of the present disclosure, the relay data signal being the HDMI format signal is taken as an example for illustration. The HDMI format signal is a signal in the high definition multimedia interface format, which is a signal with a format of a fully digital video and audio transmission interface suitable for image transmission, which may transmit uncompressed high-definition video and multi-channel audio signals simultaneously, and has characteristics of easy to use and intellectualization.

In S300: the signal conversion circuit 221 converts the relay data signal into a display drive signal, and outputs the display drive signal to at least one display screen 222 of the vehicle-mounted display assembly 22, so as to drive the at least one display screen 222 to display.

In some examples, the HDMI format signal is used for signal transmission between the vehicle-mounted control device 21 and the vehicle-mounted display assembly 22, which effectively avoids large signal attenuation of the signal to be displayed due to a large distance between the vehicle-mounted control device 21 and the vehicle-mounted display assembly 22. Therefore, it is possible to ensure lossless, high-definition and high-quality transmission over a long distance, so that the vehicle-mounted display assembly 22 in the carriage body 12 may better realize multimedia functions. That is, it is ensured that the display screen 222 in the vehicle-mounted display assembly 22 is able to present clearer images.

Figure 6:
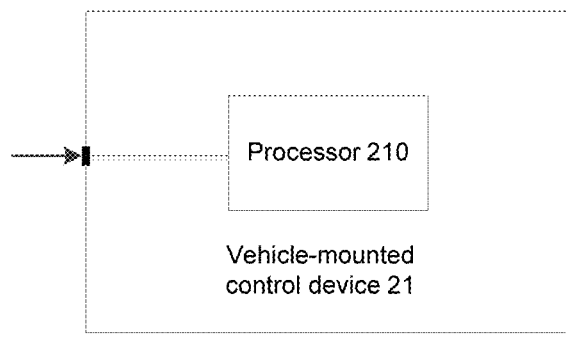
FIG. 6 is a schematic diagram of a vehicle-mounted control device, according to some embodiments of the present disclosure.

In some embodiments, as shown in FIG. 6, the vehicle-mounted control device 21 includes: a processor 210 and at least one signal input interface electrically connected to the processor 210. The at least one signal input interface is configured to receive the signal to be displayed. After each signal input interface of the vehicle-mounted control device 21 receives the signal to be displayed, the processor 210 thereof is able to transmit the signal to be displayed, which is transmitted as a relay data signal, to the signal conversion circuit 221 of the corresponding vehicle-mounted display assembly 22.

Figure 7:
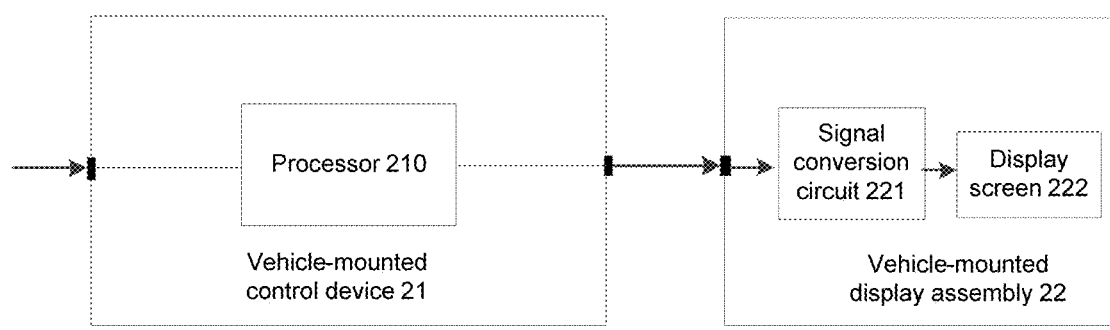
FIG. 7 is a schematic diagram of another vehicle-mounted display system, according to some embodiments of the present disclosure.
Figure 8:
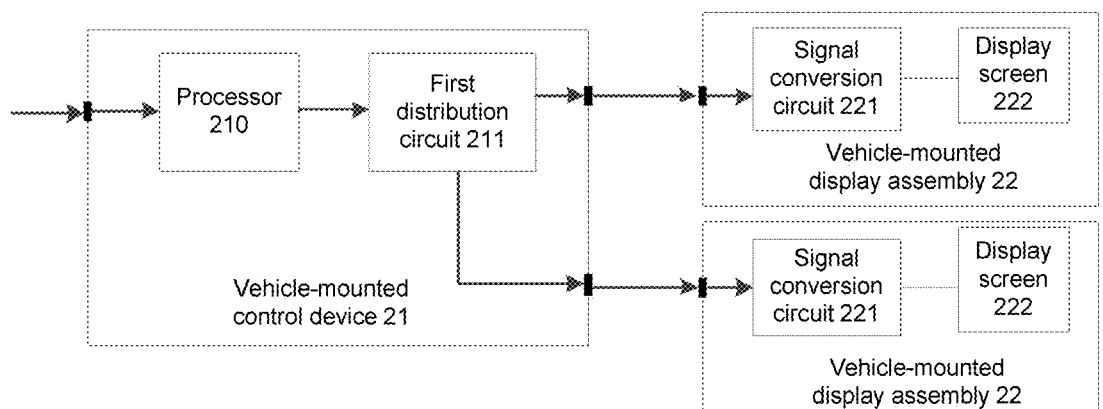
FIG. 8 is a schematic diagram of yet another vehicle-mounted display system, according to some embodiments of the present disclosure.

In addition, as shown in FIG. 7, the vehicle-mounted control device 21 further includes at least one signal output interface electrically connected to the processor 210. The at least one signal output interface is configured to transmit the relay data signal.

For example, in a case where the signal to be displayed is an HDMI format signal, the processor 210 directly transmits the HDMI format signal to the signal conversion circuit 221 of the vehicle-mounted display assembly 22 through each signal output interface. In a case where the signal to be displayed is not an HDMI format signal, the processor 210 first converts the signal to be displayed into an HDMI format signal, and then transmits the HDMI format signal obtained by converting to the signal conversion circuit 221 of the corresponding vehicle-mounted display assembly 22 through each signal output interface.

Therefore, the type of the signal source and the type of the signal to be displayed are not limited in some embodiments of the present disclosure.

In some examples, the signal source is a personal computer (PC) or an advertisement player box. In this case, the signal to be displayed provided by the signal source may be directly an HDMI format signal.

In some other embodiments, the signal source is a vehicle-mounted broadcasting system. In this case, the signal to be displayed provided by the signal source is an Ethernet signal, that is, it is not an HDMI format signal. In a case where the Ethernet signal is used as the signal to be displayed, the sending process of the signal to be displayed is simple, and has low cost and strong expandability.

That is, no matter what information distribution system (such as a PC, an advertisement player box or a vehicle-mounted broadcasting system) is selected as the signal source, and no matter the signal to be displayed provided by the signal source is an HDMI format signal or is not an HDMI format signal, the vehicle-mounted control device 21 is able to transmit the signal to be displayed to the signal conversion circuit 221 of the corresponding vehicle-mounted display assembly 22 in the HDMI format.

In addition, in some embodiments, an HDMI format signal directly output by the signal source is directly sent to the signal conversion circuit 221 of the vehicle-mounted display assembly 22 without passing through the vehicle-mounted control device 21, so that the vehicle-mounted display assembly 22 may be used as a general display terminal without being controlled by the vehicle-mounted control device 21. Therefore, a display function of the vehicle-mounted display assembly 22 may be realized without being controlled by the vehicle-mounted control device 21, and it is easy to realize an independent debugging of the vehicle-mounted display assembly 22. In some embodiments, the S200 of the vehicle-mounted display control method further includes: transmitting, by the vehicle-mounted control device 21, the relay data signal to the signal conversion circuit 221 of the corresponding vehicle-mounted display assembly 22 in a wired transmission manner.

For example, the vehicle-mounted control device 21 is electrically connected to the corresponding vehicle-mounted display assembly 22 through a connecting line. As shown in FIG. 2, the vehicle-mounted control device 21 is located between the housing 11 and the carriage body 12, the vehicle-mounted display assembly 22 is located in the carriage body 12, and the vehicle-mounted display assembly 22 is fixed to an inner wall of the carriage body 12 through a connector 14. On this basis, a part of the connecting line between the vehicle-mounted control device 21 and the vehicle-mounted display assembly 22 is located between the housing 11 and the carriage body 12, and the remaining part of the connecting line is located in the connector 14. In addition, in a case where the vehicle-mounted display assembly 22 is directly fixed to the inner wall of the carriage body 12 without the connector 14, the connecting line between the vehicle-mounted control device 21 and the vehicle-mounted display assembly 22 is completely located between the housing 11 and the carriage body 12. Therefore, a hidden arrangement of the connecting line between the vehicle-mounted control device 21 and the vehicle-mounted display assembly 22 may be realized, which prevents the connecting line from being exposed, and improves the appearance of the interior of the carriage body 12. In this way, the connecting line may be protected, and the safety of the signal transmission is improved.

In some examples, as shown in FIG. 2, at least one armrest 13 is disposed in the carriage body 12. One end of each of the at least one armrest 13 is connected to a side wall of the carriage body 12, and another end thereof extends vertically upwards in a direction away from the ground and is connected to the top of the carriage body 12. The vehicle-mounted display assembly 22 is disposed between the carriage body 12 and the armrest 13, and is fixedly connected to an armrest 13 corresponding to the vehicle-mounted display assembly 22 through the connector 14. Each armrest 13 is disposed in carriage body 12 and at the middle of the corresponding carriage in its extending direction. Therefore, the vehicle-mounted display assembly 22 is fixedly connected to the corresponding armrest 13, which may make full use of the space in the carriage body 12, and allow more people in the carriage body 12 to watch the displayed images.

For example, as shown in FIG. 2, at least one seat 16 is disposed in the carriage body 12, and the back of the at least one seat 16 is proximate to the side wall of the carriage body 12. Partition plates 15 are provided on both sides of each of the at least one seat 16. The partition plate 15 is disposed between the side wall of the carriage body 12 and the corresponding armrest 13, and is perpendicular to the side wall of the carriage body 12 and the armrest 13. The partition plate 15 is made of a transparent material. In this way, barriers can be formed at both sides of the seat 16 without influencing the display of the vehicle-mounted display assembly 22.

Figure 3:
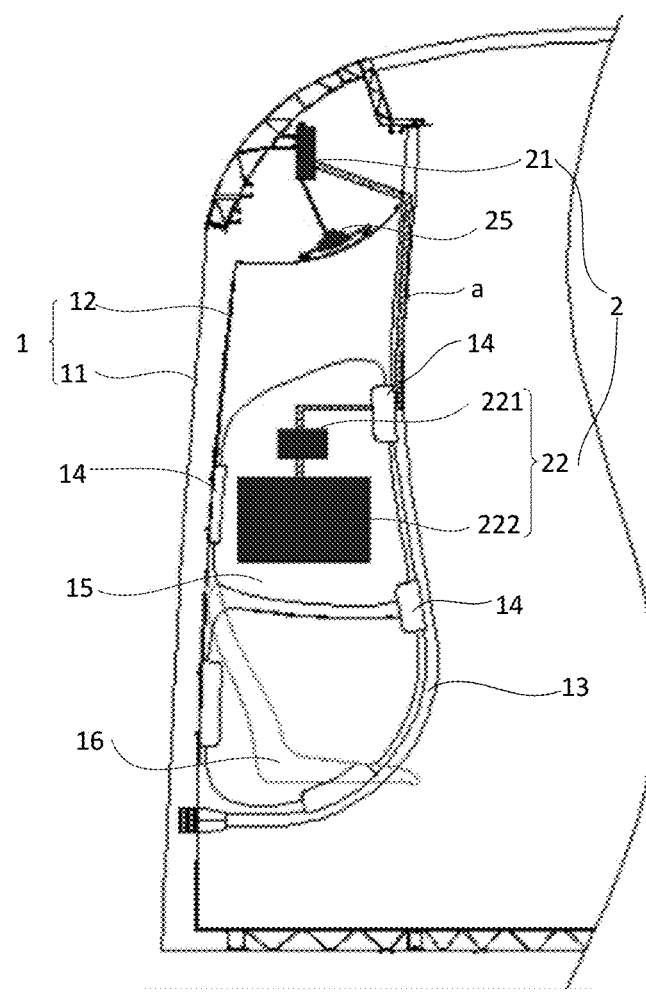
FIG. 3 is a partial diagram of another schematic diagram of AA section of the vehicle shown in FIG. 1.

For example, as shown in FIG. 3, the armrest 13 has a hollowed structure, and a connector 14 connected to the armrest 13 also has a hollowed structure (for example, the armrest is provided with a through hole therein). In addition, optionally, the two ends of the armrest 13 are connected to the top and bottom of the carriage body 12 (i.e., in a vertically arrangement). Or, the armrest 13 has a certain shape and curvature, which is not limited in some embodiments of the present disclosure.

On this basis, in some examples, as shown in FIG. 3, a part of the connecting line between the vehicle-mounted control device 21 and the vehicle-mounted display assembly 22 is located in the armrest 13 corresponding to the vehicle-mounted display assembly 22, a part of the connecting line is located between the housing 11 and the carriage body 12, and a part of the connecting line is located in the connector 14. In some other examples, a part of the connecting line between the vehicle-mounted control device 21 and the vehicle-mounted display assembly 22 is located in the armrest 13 corresponding to the vehicle-mounted display assembly 22, and the remaining part of the connecting line is located in the connector 14. It can be seen that, some embodiments of the present disclosure realize a hidden arrangement of the connecting line between the vehicle-mounted control device 21 and the vehicle-mounted display assembly 22, which prevents the connecting line from being exposed, and improves the appearance of the interior of the carriage body 12. Moreover, the connecting line may be protected, and the safety of the signal transmission may be improved.

In some other embodiments, the S200 of the vehicle-mounted display control method further includes: transmitting, by the vehicle-mounted control device 21, the relay data signal to the signal conversion circuit 221 of the corresponding vehicle-mounted display assembly 22 in a wireless transmission manner.

For example, the vehicle-mounted control device 21 is electrically connected to the corresponding vehicle-mounted display assembly 22 through electric signals. In this case, the vehicle-mounted control device 21 further includes an HDMI wireless transmission module. The HDMI wireless transmission module is electrically connected to the processor 210 of the vehicle-mounted control device 21 and the signal conversion circuit 221 of the corresponding vehicle-mounted display assembly 22, thereby realizing the wireless communication of the HDMI format signal between the vehicle-mounted control device 21 and the vehicle-mounted display assembly 22.

In some embodiments, the vehicle-mounted control device 21 includes at least two signal output interfaces. The vehicle-mounted control device 21 further includes a first distribution circuit 211 electrically connected to the processor 210 and the at least two signal output interfaces. The first distribution circuit 211 is configured to copy the relay data signal into at least two relay data signals, and transmits the at least two relay data signals to the two at least two signal output interfaces in a one-to-one correspondence.

Figure 9:
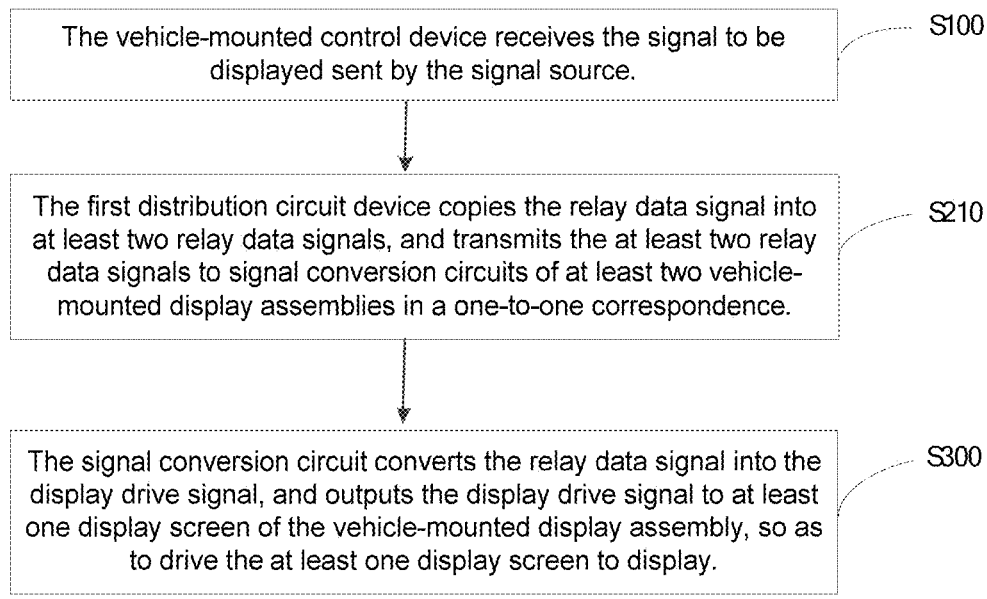
FIG. 9 is a schematic flow chart of another vehicle-mounted display control method, according to some embodiments of the present disclosure.

In this case, as shown in FIG. 9, the S200 of the vehicle-mounted display control method further includes S210.

In S210: the first distribution circuit 211 copies the relay data signal into at least two relay data signals, and transmits the at least two relay data signals to signal conversion circuits 221 of at least two vehicle-mounted display assemblies 22 in a one-to-one correspondence.

For example, by using the first distribution circuit 211 to copy the HDMI format signal, one vehicle-mounted control device 21 may control at least two vehicle-mounted display assemblies 22. In this way, the number of the vehicle-mounted control devices 21 may be reduced, thereby effectively reducing the cost.

For example, the first distribution circuit 211 uses a chip as a carrier, and the chip model of the first distribution circuit 211 may be selected according to actual needs. The first distribution circuit 211 copies the relay data signal into a different number of relay data signals (such as HDMI format signals) and outputs them, so as to meet different requirements of the vehicle-mounted control device 21 on the number of output signals under different working conditions. For example, the chip model of the first distribution circuit 211 is IT6661.

Figure 10:
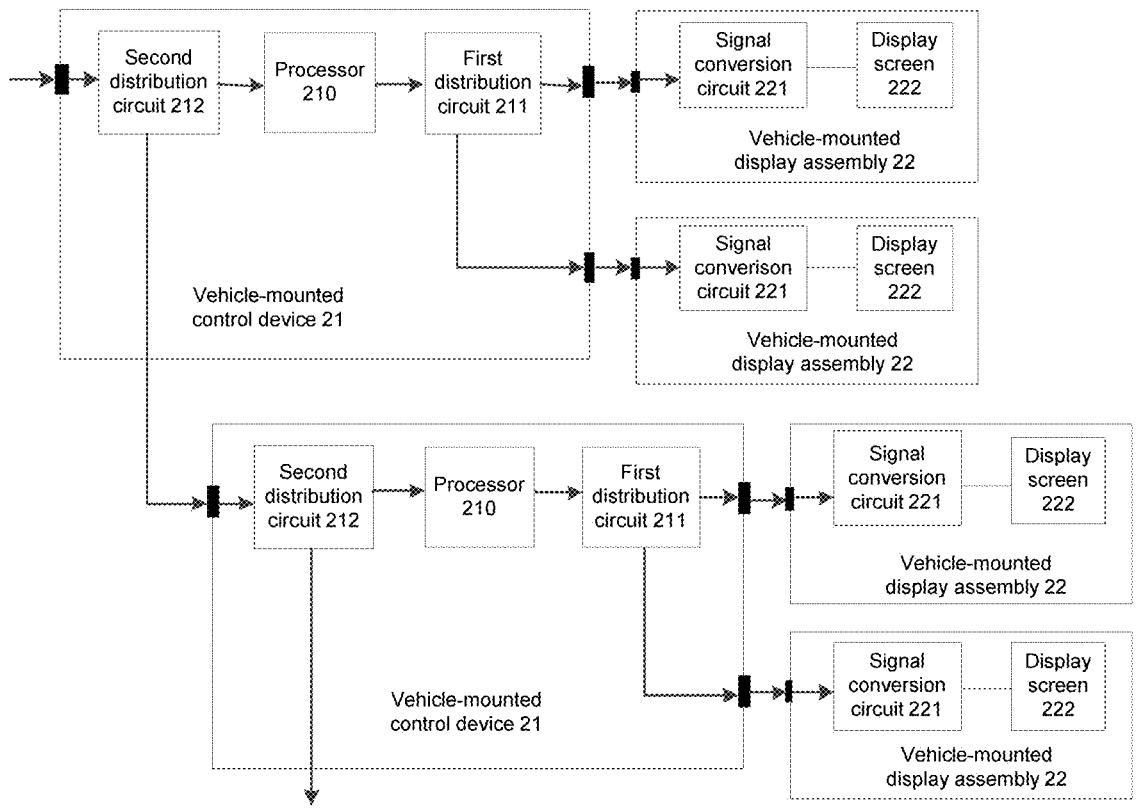
FIG. 10 is a schematic diagram of yet another vehicle-mounted display system, according to some embodiments of the present disclosure.

In some embodiments, as shown in FIG. 10, the vehicle-mounted control device 21 further includes a second distribution circuit 212. The second distribution circuit 212 is electrically connected to the processor 210 and at least one signal input interface. The second distribution circuit 212 is configured to copy the signal to be displayed into at least two signals to be displayed, and transmit one of the at least two signals to be displayed to the processor 210.

Figure 11:
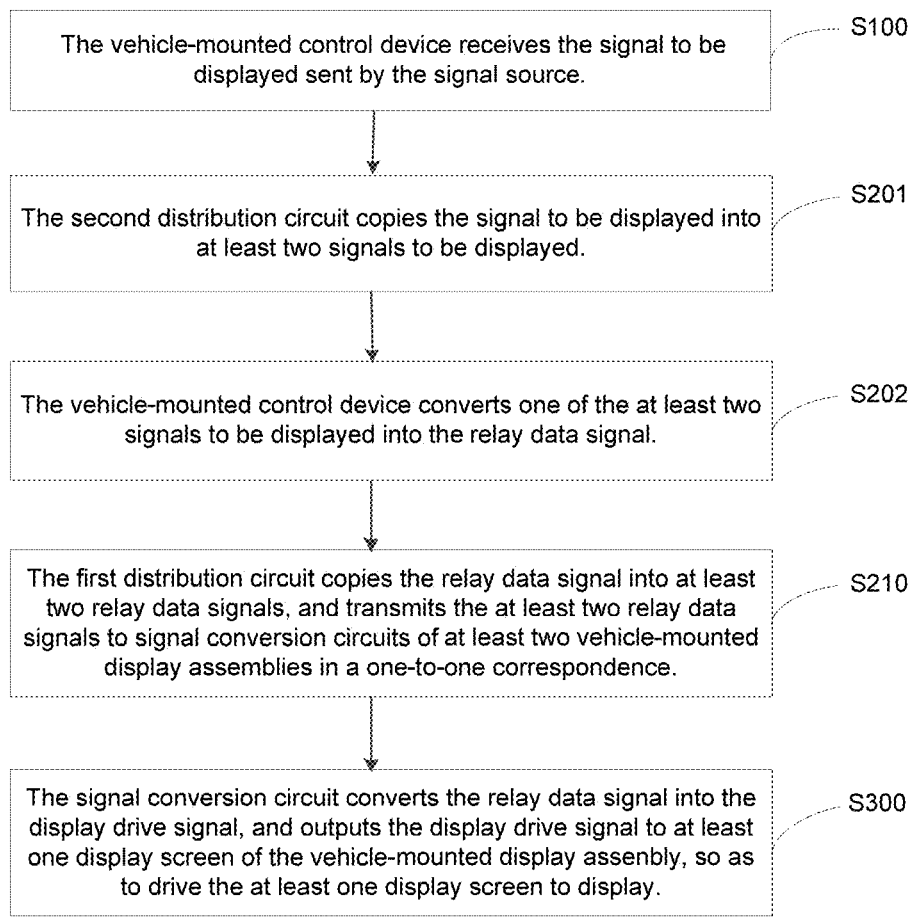
FIG. 11 is a schematic flow chart of yet another vehicle-mounted display control method, according to some embodiments of the present disclosure.

In this case, as shown in FIG. 11, before the S210, the control method further includes S201 and S202.

In S201: the second distribution circuit 212 copies the signal to be displayed into at least two signals to be displayed.

In S202: the vehicle-mounted control device 21 converts one of the at least two signals to be displayed into a relay data signal.

Herein, the second distribution circuit 212 is used to copy the signal to be displayed into at least two signals to be displayed, and then transmit one of the at least two signals to be displayed to the processor 210 for conversion, and reserve the remaining unconverted signal(s) to be displayed of the at least two signals to be displayed as standby signal(s). For example, the standby signal may be transmitted to a cascaded vehicle-mounted control device 21, which may improve the flexibility of signal arrangement and reduce the cost of equipment arrangement.

For example, the second distribution circuit 212 uses a chip as a carrier, and the chip model of the second distribution circuit 212 may be selected according to actual needs. The second distribution circuit 212 copies the signal to be displayed into a different number of signals to be displayed (such as HDMI format signals) and outputs them, so as to meet the different requirements of the vehicle-mounted control device 21 on the number of output signals under different working conditions. For example, in a case where the chip model of the second distribution circuit 212 is RTL8306M, the second distribution circuit 212 may simultaneously loop out four signals to be displayed.

In some embodiments, as shown in FIG. 10, the number of the vehicle-mounted control devices 21 is at least two, and the at least two vehicle-mounted control devices 21 are cascaded. The second distribution circuit 212 of each of the at least two vehicle-mounted control devices 21 is electrically connected to a next-level vehicle-mounted control device 21.

In this case, the vehicle-mounted display control method further includes: transmitting, by the vehicle-mounted control device 21, the unconverted signal to be displayed of the at least two signals to be displayed to the next-level vehicle-mounted control device 21 cascaded therewith.

Herein, it will be noted that, if the next-level vehicle-mounted control device 21 cascaded with the vehicle-mounted control device 21 has a further next-level vehicle-mounted control device 21, the second distribution circuit 212 of the vehicle-mounted control device 21 is electrically connected to the second distribution circuit 212 of the next-level vehicle-mounted control device 21 cascaded therewith. If the next-level vehicle-mounted control device 21 cascaded with the vehicle-mounted control device 21 does not have a further next-level vehicle-mounted control device 21 (for example, the next-level vehicle-mounted control device 21 is the last vehicle-mounted control device 21), the second distribution circuit 212 of the vehicle-mounted control device 21 is electrically connected to the next-level vehicle-mounted control device 21 cascaded therewith.

Herein, in a case where the number of the vehicle-mounted control devices 21 is two or more than two, the vehicle-mounted control device 21 transmits the standby signal as a signal to be displayed to the next-level vehicle-mounted control device 21 cascaded therewith. That is, it is not necessary to directly connect all the vehicle-mounted control devices 21 to the signal source, so that the number of lines may be effectively reduced, the complexity of the equipment may be effectively reduced, and the cost is reduced.

Figure 12:
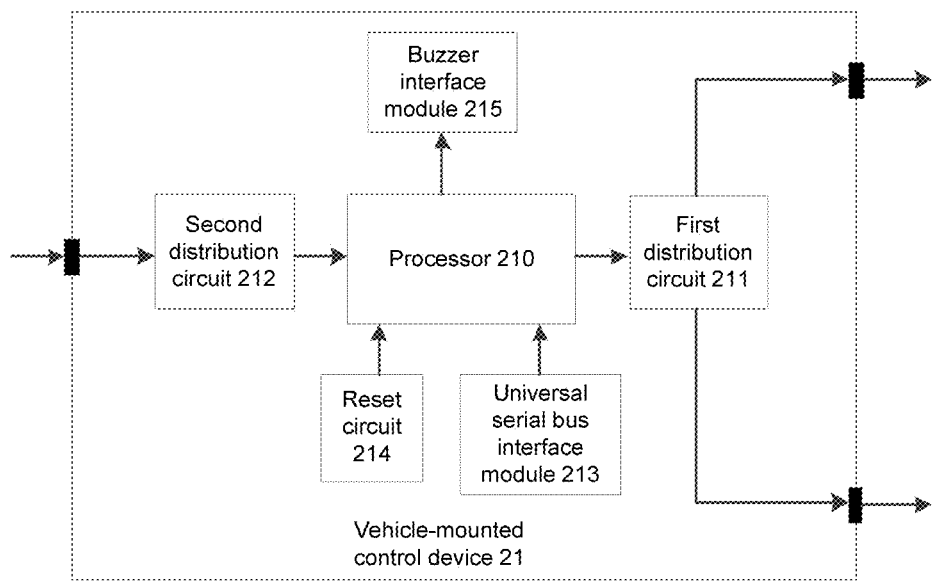
FIG. 12 is a schematic diagram of another vehicle-mounted control device, according to some embodiments of the present disclosure.

In some embodiments, as shown in FIG. 12, the vehicle-mounted control device 21 further includes a universal serial bus (USB) interface module 213, and the USB interface module 213 is electrically connected to the processor 210 and the USB interface (not shown in the figure). Through the USB interface module 213 and the USB interface, a system file can be stored and exported and the vehicle-mounted control device 21 can be upgraded and updated. For example, the system file is stored in a U disk. In a case where the vehicle-mounted control device 21 is in an off state, the U disk is inserted into its USB interface. After the vehicle-mounted control device 21 is turned on, the processor 210 may read the system file in the U disk and write the system file into the memory of the vehicle-mounted control device 21 to complete the upgrade and update of the vehicle-mounted control device 21.

In some embodiments, as shown in FIG. 12, the vehicle-mounted control device 21 further includes a reset circuit 214, and the reset circuit 214 is electrically connected to the processor 210 and a reset switch. By performing on/off operation on the reset switch, the reset circuit 214 can reset the vehicle-mounted control device 21 and reboot the vehicle-mounted control device 21 when an abnormality occurs.

In some embodiments, as shown in FIG. 12, the vehicle-mounted control device 21 further includes a buzzer interface module 215, and the buzzer interface module 215 is electrically connected to the processor 210 and a buzzer. The buzzer interface module 215 is configured to drive the buzzer to report errors through different alarms when faults occur, so that the type of the fault may be determined, and it is easy to carry out maintenance and debugging.

In addition, in some examples, the vehicle-mounted control device 21 uses a chip as a carrier, such as a system-on-a-chip (SoC). That is, modules with different functions are integrated in a single chip. In this way, the degree of integration of the vehicle-mounted control device 21 is higher, and the size of the vehicle-mounted control device 21 is reduced.

In some embodiments, as shown in FIG. 7, the vehicle-mounted display assembly 22 includes a signal conversion circuit 221 and at least one display screen 222. The signal conversion circuit 221 is electrically connected to the at least one display screen 222. The signal conversion circuit 221 is configured to receive the relay data signal transmitted by the corresponding vehicle-mounted control device 21, convert the relay data signal into a display drive signal, and output the display drive signal to the at least one display screen 222 to drive the at least one display screen 222 to display. Herein, in FIG. 7, one display screen 222 is used for illustration.

For example, the signal format of the display drive signal is the LVDS format, the MIPI format, the EDP format, or the like. The signal format of the display drive signal is not limited in some embodiments of the present disclosure, as long as the display drive signal can drive the display screen 222 to display.

In some embodiments, the vehicle-mounted display assembly 22 further includes at least one signal input interface. The at least one signal input interface is electrically connected to the signal conversion circuit 221. The signal conversion circuit 221 receives the relay data signal transmitted by the vehicle-mounted control device 21 through the signal input interface.

Figure 13:
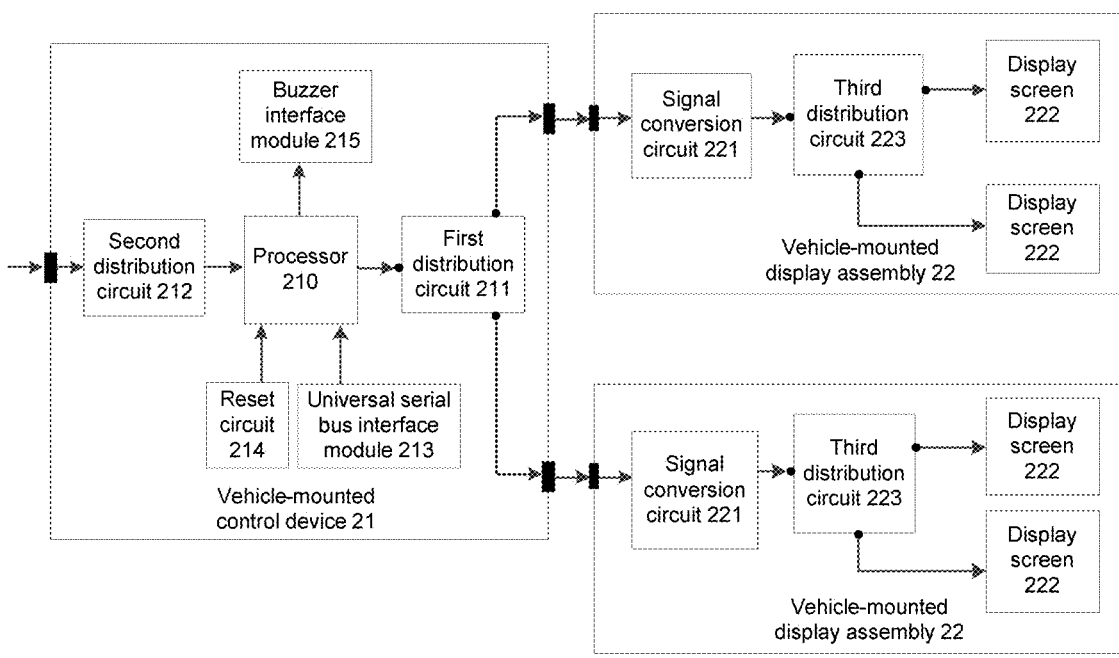
FIG. 13 is a schematic diagram of yet another vehicle-mounted display system, according to some embodiments of the present disclosure.

In some embodiments, as shown in FIG. 13, the vehicle-mounted display assembly 22 includes at least two display screens 222, and the vehicle-mounted display assembly 22 further includes a third distribution circuit 223. The third distribution circuit 223 is electrically connected to the signal conversion circuit 221 and the display screens 222. The third distribution circuit 223 is configured to copy the display drive signal into at least two display drive signals, and transmit the at least two display drive signals to the at least two display screens 222 in a one-to-one correspondence.

Figure 14:
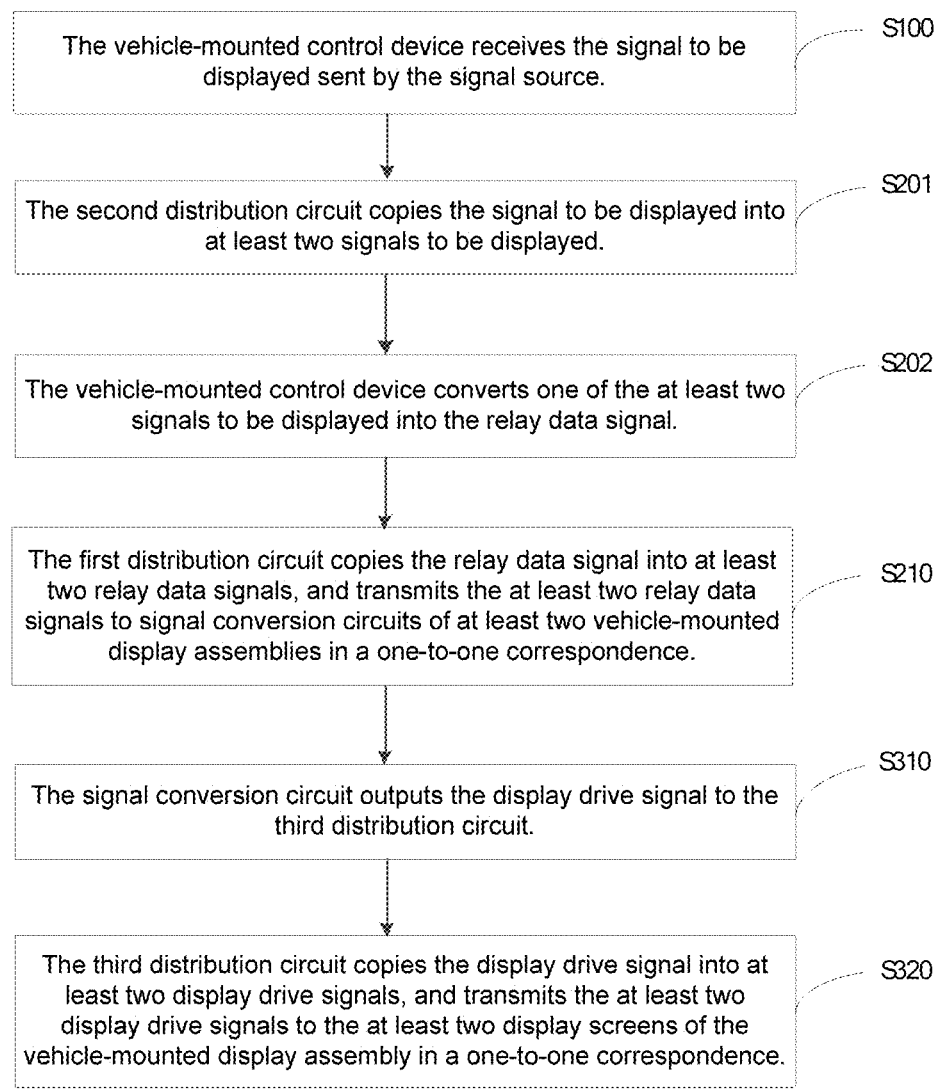
FIG. 14 is a schematic flow chart of yet another vehicle-mounted display control method, according to some embodiments of the present disclosure.

In this case, as shown in FIG. 14, the S300 further includes S310 and S320.

In S310: the signal conversion circuit 221 outputs the display drive signal to the third distribution circuit 223.

In S320: the third distribution circuit 223 copies the display drive signal into at least two display drive signals, and transmits the at least two display drive signals to the at least two display screens 222 of the vehicle-mounted display assembly 22 in a one-to-one correspondence.

Herein, by using the third distribution circuit 223 to copy the display drive signal, it may be achieved that one signal conversion circuit 221 transmits display drive signals to at least two display screens 222. In this way, the number of the signal conversion circuits 221 may be reduced, and the arrangement cost may be reduced.

For example, the third distribution circuit 223 uses a chip as a carrier, and the chip model of the third distribution circuit 223 may be selected according to actual needs. The third distribution circuit 223 copies the display drive signal into a different number of display drive signals (such as HDMI format signals) and outputs them, so as to meet the different requirements of the vehicle-mounted control device 22 on the number of output signals under different working conditions. For example, the chip model of the third distribution circuit 223 is STDP4320.

In some embodiments, the display screen 222 further includes: a display panel and a screen drive circuit electrically connected to the display panel. The screen drive circuit is configured to convert the display drive signal into a screen drive signal and send the screen drive signal to the display panel to drive the display panel to display. For example, the screen drive signal is a control signal, a timing signal, a scanning drive signal, a data drive signal, etc. that may be identified by the display panel.

In some embodiments, every two of the at least two display screens 222 are arranged back-to-back, and each display screen 222 is a liquid crystal display screen, so that a double-sided display may be achieved, and more people in the carriage body 12 can view them.

In some embodiments, at least two of the signal conversion circuit 221, the third distribution circuit 223, or the at least one display screen 222 are integrated. For example, the signal conversion circuit 221 and the third distribution circuit 223 are integrated, so that the signal conversion circuit 221 and the third distribution circuit 223 may be integrated on a same circuit board or in a same housing structure; or, the signal conversion circuit 221 and the at least one display screen 222 are integrated, so that the signal conversion circuit 221 may be disposed in the housing structure of the display screen 222 integrated therewith; or, at least one display screen 222 and the third distribution circuit 223 are integrated, so that the third distribution circuit 223 is disposed in the housing structure of the display screen 222 integrated therewith; or, the signal conversion circuit 221, the at least one display screen 222, and the third distribution circuit 223 are integrated, so that the signal conversion circuit 221 and the third distribution circuit 223 may be disposed in the housing structure of a display screen 222 integrated with the two. Therefore, the energy consumption and the size of the vehicle-mounted display assembly 22 may be reduced, and the reliability of the vehicle-mounted display assembly 22 may be enhanced.

In summary, the vehicle-mounted control device 21 and the vehicle-mounted display assembly 22 are applied into the vehicle-mounted display system 2, the vehicle-mounted control method in some embodiments of the present disclosure may be achieved, which makes the image displayed by the vehicle-mounted display system 2 clearer. The application of the vehicle-mounted display system into vehicles may improve the multimedia functions of the vehicles, and make the vehicles have better image display effect, higher space utilization rate and better appearance. Herein, the vehicle may be, but is not limited to, a subway, a light rail, or the like.

In the description of the above embodiments, specific features, structures, materials or characteristics may be combined in any suitable manner in any one or more embodiments or examples.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A vehicle-mounted display control method, comprising:

receiving, by a vehicle-mounted control device, a signal to be displayed sent by a signal source;

converting, by the vehicle-mounted control device, the signal to be displayed into a relay data signal;

transmitting, by the vehicle-mounted control device, the relay data signal to a signal conversion circuit of a corresponding vehicle-mounted display assembly;

converting, by the signal conversion circuit, the relay data signal into a display drive signal; and outputting, by the signal conversion circuit, the display drive signal to at least one display screen of the vehicle-mounted display assembly, so as to drive the at least one display screen to display;

wherein the vehicle-mounted control device and the vehicle-mounted display assembly are disposed in a vehicle body including a housing and a carriage body located in the housing; the vehicle-mounted control device is located between the carriage body and the housing, and the vehicle-mounted display assembly is located in the carriage body;

wherein a number of the vehicle-mounted display assemblies is at least two, the vehicle-mounted control device corresponds to the at least two vehicle-mounted display assemblies, and the vehicle-mounted control device includes a first distribution circuit; and transmitting, by the vehicle-mounted control device, the signal to be displayed that is transmitted as a relay data signal to the signal conversion circuit of the corresponding vehicle-mounted display assembly, includes:

copying, by the first distribution circuit, the relay data signal into at least two relay data signals, and transmitting, by the first distribution circuit, the at least two relay data signals to signal conversion circuits of the at least two vehicle-mounted display assemblies in a one-to-one correspondence.

2. The vehicle-mounted display control method according to claim 1, wherein transmitting, by the vehicle-mounted control device, the signal to be displayed that is transmitted as a relay data signal to the signal conversion circuit of the corresponding vehicle-mounted display assembly, includes:

transmitting, by the vehicle-mounted control device, the relay data signal to the signal conversion circuit of the corresponding vehicle-mounted display assembly in a wired transmission manner or a wireless transmission manner.

3. The vehicle-mounted display control method according to claim 1, wherein the vehicle-mounted control device includes a second distribution circuit;
the vehicle-mounted display control method further comprises:
copying, by the second distribution circuit, the signal to be displayed into at least two signals to be displayed; and
converting, by the vehicle-mounted control device, one of the at least two signals to be displayed into the relay data signal.

4. The vehicle-mounted display control method according to claim 3, wherein a number of the vehicle-mounted control devices is at least two, the at least two vehicle-mounted control devices are cascaded, and a second distribution circuit of each of the at least two vehicle-mounted control device is electrically connected to a next-level vehicle-mounted control device;
the vehicle-mounted display control method further comprises:
transmitting, by the vehicle-mounted control device, an unconverted signal to be displayed of the at least two signals to be displayed to the next-level vehicle-mounted control device cascaded therewith.

5. The vehicle-mounted display control method according to claim 1, wherein the at least one display screen includes at least two display screens, and the vehicle-mounted display assembly further includes a third distribution circuit;
outputting, by the signal conversion circuit, the display drive signal to at least one display screen of the corresponding vehicle-mounted display assembly, further includes:
outputting, by the signal conversion circuit, the display drive signal to the third distribution circuit;
copying, by the third distribution circuit, the display drive signal into at least two display drive signals; and
transmitting, by the third distribution circuit, the at least two display drive signals to at least two display screens of the vehicle-mounted display assembly in a one-to-one correspondence.

6. The vehicle-mounted display control method according to claim 1, wherein the relay data signal includes one of a high definition multimedia interface (HDMI) format signal, a digital visual interface (DVI) format signal, or a display port (DP) format signal.

7. A vehicle-mounted control device, comprising:
at least one signal input interface configured to receive a signal to be displayed;
a processor electrically connected to the at least one signal input interface, and configured to transmit the signal to be displayed that is transmitted as a relay data signal; and
at least one signal output interface electrically connected to the processor, and configured to transmit the relay data signal;
wherein the at least one signal output interface includes at least two signal output interfaces; and the vehicle-mounted control device further comprises:
a first distribution circuit electrically connected to the processor and the at least two signal output interfaces, and configured to copy the relay data signal into at least two relay data signals, and transmit the at least two relay data signals to the at least two signal output interfaces in a one-to-one correspondence.

8. The vehicle-mounted control device according to claim 7, further comprising:
a second distribution circuit electrically connected to the processor and the at least one signal input interface, and configured to copy the signal to be displayed into at least two signals to be displayed, and transmit one of the at least two signals to be displayed to the processor.

9. A vehicle-mounted display system, comprising:
at least one vehicle-mounted control device according to claim 8; wherein a number of the vehicle-mounted control device is at least two, and the at least two vehicle-mounted control devices are cascaded; and
at least one vehicle-mounted display assembly electrically connected to a corresponding vehicle-mounted control device, the at least one vehicle-mounted display assembly comprising:
at least one display screen; and,
a signal conversion circuit electrically connected to at least one display screen, and configured to receive a relay data signal, convert the relay data signal into a display drive signal, and output the display drive signal to the at least one display screen to drive the at least one display screen to display;
wherein the at least one display screen includes at least two display screens; and the vehicle-mounted display assembly further comprises:
a third distribution circuit electrically connected to the signal conversion circuit and the at least two display screens, and configured to copy the display drive signal into at least two display drive signals and transmit the at least two display drive signals to the at least two display screens in a one-to-one correspondence.

10. The vehicle-mounted display system according to claim 9, further comprising a power management module; wherein
the power management module is electrically connected to the at least one vehicle-mounted control device and the at least one vehicle-mounted display assembly.

11. A vehicle, comprising:
a vehicle body including a housing and a carriage body disposed in the housing; and
the vehicle-mounted display system according to claim 9, disposed in the vehicle body; wherein
the at least one vehicle-mounted control device is disposed between the carriage body and the housing of the vehicle body, and
the at least one vehicle-mounted display assembly is disposed in the carriage body of the vehicle body.

12. The vehicle according to claim 11, further comprising a connecting line;
wherein a vehicle-mounted display assembly is electrically connected to a corresponding vehicle-mounted control device through the connecting line, and at least part of the connecting line is located between the carriage body and the housing.

13. The vehicle according to claim 11, further comprising at least one armrest; wherein
the at least one armrest is disposed in the carriage body;
at least one vehicle-mounted display assembly of the vehicle-mounted display system is disposed on a corresponding armrest of the at least one armrest;
in a case where the vehicle-mounted display assembly is electrically connected to the corresponding vehicle-mounted control device through the connecting line, at least part of the connecting line is located in the armrest corresponding to the vehicle-mounted display assembly, or at least part of the connecting line is located between the carriage body and the housing, or at least part of the connecting line is located in the armrest corresponding to the vehicle-mounted display assembly and at least part of the connecting line is located between the carriage body and the housing.

14. A vehicle-mounted display assembly, comprising:
at least one display screen; and,
a signal conversion circuit electrically connected to at least one display screen, and configured to receive a relay data signal, convert the relay data signal into a display drive signal, and output the display drive signal to the at least one display screen to drive the at least one display screen to display;
wherein the at least one display screen includes at least two display screens; and the vehicle-mounted display assembly further comprises:
a third distribution circuit electrically connected to the signal conversion circuit and the at least two display screens, and configured to copy the display drive signal into at least two display drive signals and transmit the at least two display drive signals to the at least two display screens in a one-to-one correspondence.

* * * * *